United States Patent [19]

Jacques et al.

[11] 3,832,567

[45] Aug. 27, 1974

[54] TRAVELLING WAVE FREQUENCY CONVERTER ARRANGEMENT

[75] Inventors: Andre Jacques; Daniel Ostrowsky; Michel Papuchon, all of Paris, France

[73] Assignee: Thomson-CSF, Paris, France

[22] Filed: July 20, 1973

[21] Appl. No.: 381,094

[30] Foreign Application Priority Data

July 26, 1972 France ............................ 72.26711

[52] U.S. Cl. ................ 307/88.3, 321/69 R, 332/52, 350/160

[51] Int. Cl. .......................... H02m 5/04, G02f 1/28

[58] Field of Search ........ 307/88.3; 321/69; 332/52; 350/160

[56] References Cited

UNITED STATES PATENTS

| | | | |
|---|---|---|---|
| 3,584,230 | 6/1971 | Tien | 307/88.3 |
| 3,655,993 | 4/1972 | Wolff | 307/88.3 |

*Primary Examiner*—Herman Karl Saalbach
*Assistant Examiner*—Darwin R. Hostetter
*Attorney, Agent, or Firm*—Cushman, Darby & Cushman

[57] ABSTRACT

The present invention relates to travelling wave frequency converter arrangements based on the harmonic generation. The converter in accordance with the invention comprises a harmonic generation interface obtained by bringing together a metal film and an optical waveguide layer whose thickness is such that the phase velocities of the fundamental and harmonic frequency radiations transmitted are substantially matched with one another. Optical coupling means are associated with the optical waveguide and electrical means may be provided for altering the phase velocity matching.

9 Claims, 8 Drawing Figures

TRAVELLING WAVE FREQUENCY CONVERTER ARRANGEMENT

The present invention relates to frequency converter arrangements designed to produce from guided electromagnetic radiation of frequency ω, guided electromagnetic radiation show frequency is a multiple of the frequency ω. Such converter arrangements are intended in particular for use in the field of integrated optical systems, thus designated by analogy with integrated electronic circuits which are monolithic structures utilising thin films.

It is well known that the interaction of a fundamental electromagnetic radiation of frequency ω with an anisotropic material such as double-refracting crystals of potassium phosphate (KDP), gives rise to harmonic electromagnetic radiation of frequency p.ω, where p is an integer greater than unity. However, the major part of the emergent energy is still at the fundamental frequency ω, indicating that the conversion efficiency is generally poor. This kind of non-linear interaction also takes place at the time of refraction, and accompanying reflection, of a light beam at the interface separating two media having different refractive indices; however, the intensity of the conversion phenomenon is very much less marked than it is in the foregoing case.

In the field of integrated optical systems, there is a problem in utilising this non-linear phenomenon in order to achieve an adequate conversion efficiency, due to the fact that the deposition of anisotropic material in thin films cannot be carried out by using the conventional techniques employed for the manufacture of electronic integrated circuits.

In accordance with the present invention, there is provided a travelling wave frequency converter arrangement for generating a harmonic electromagnetic radiation of frequency p times higher than the frequency of an incoming fundamental electromagnetic radiation, p being an integer greater than unity, said arrangement comprising: an optical waveguide layer of at least one refractive material having one free face and a further face parallel to said free face, a further material positioned for forming with said further face an interface having harmonic generation properties, and coupling means arranged at the opposite ends of said free face for respectively launching and collecting at least one of said electromagnetic radiations travelling along said optical waveguide layer; the thickness of said refractive material being selected for matching with one another the respective phase velocities of said electromagnetic radiations.

This converter arrangement, which can be utilised in the form of an integrated optical system thanks to the use of materials which are readily capable of deposition in thin film form, makes it possible to achieve the generation of harmonics by successive reflections of the radiation of frequency ω at the interface between two superimposed films. The energy conversion effects produced with each reflection are cumulative thanks to an appropriate choice of the phase velocities of propagation along the interface.

More precisely, said converter may be constituted by two materials deposited upon a substrate in the form of superimposed thin films, namely first of all a metal film and then a dielectric film, the latter constituting an optical waveguide and having a thickness such that the phase velocities of propagation of the travelling fundamental and harmonic radiations are substantially matched with one another.

For a better understanding of the present invention, and to show how the same may be carried into effect, reference will be made to the ensuing description and the attached figures among which:

Figure 1:
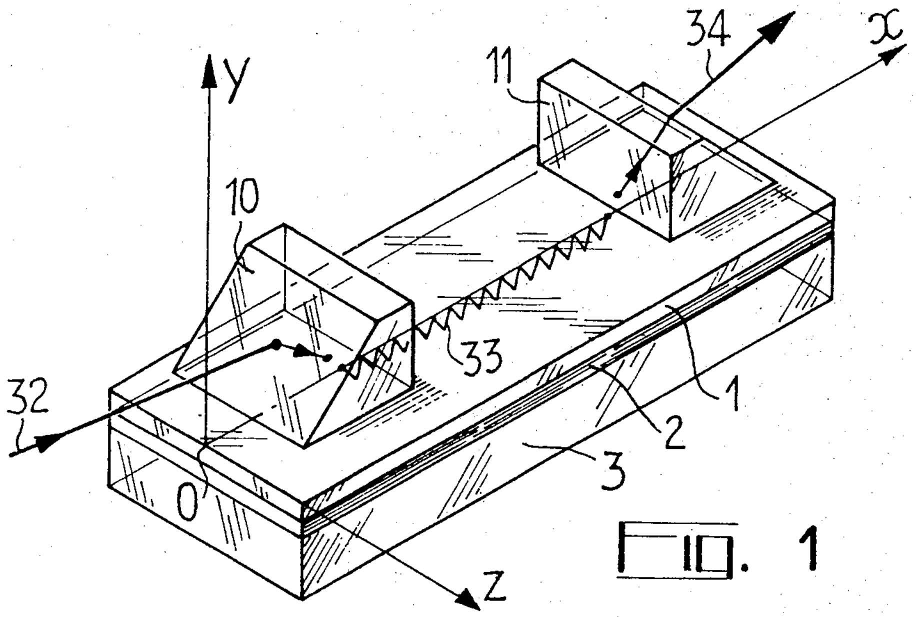
FIG. 1 illustrates a travelling wave frequency converter arrangement in accordance with the invention.

The device shown in FIG. 1 comprises, deposited successively on a substrate 3, a metal film 2 and a transparent dielectric layer 1 such as glass, having a high refractive index, constituting an optical waveguide layer for radiated electromagnetic energy. The layers 1 and 2 can be deposited using any of the methods known in the context of electronic integrated circuits. In the layer 1 constituting the optical waveguide, a beam of fundamental electromagnetic radiation 33, of frequency ω, propagates by a mechanism of total reflection at the guide-air interface which is a free face and by metallic reflection at the interface between the guide and the film 2 which is parallel to the free face.

The layer 2, metallic in the embodiment described previously, can be constituted equally well by a dielectric or semiconductor such as a centrosymmetrical polycrystal, which can be readily deposited in the form of thin films by using conventional techniques.

However, as calculation shows the order of magnitude of the non-linear phenomenon responsible for harmonic waves generation at the interface between the guide 1 and the layer 2, is much more pronounced in the case of metallic reflection than in any other case.

In FIG. 1, there have also been illustrated a reference system OXYZ, where OX represents the direction of propagation of the radiations in the optical waveguide 1, and optical coupling means 10 and 11 which respectively serve for the injection of a radiation 32 into and the picking up of a radiation 34 from, the guide 1.

When a beam of electromagnetic radiation of frequency propagates through a guide of this kind, at each of the successive reflections at the interface between the guide 1 and the metal 2, harmonic radiation is generated, preponderant amongst which is the second harmonic radiation. In addition, in order that the effects produced with each of these reflections shall be cumulative, the invention provides that the harmonic radiation produced with each reflection should be phase matched; to this end, the phase velocities of propagation of the fundamental, of frequency ω, and that of the harmonic, of frequency 2 ω, are made substantially equal.

In any waveguide, those skilled in the art will be aware that the radiation can only travel in accordance with a discrete number of propagation modes each characterised by a specific electromagnetic field distribution; in addition, the phase velocity of propagation of energy through the waveguide has a definite value. With this velocity, there corresponds a wave number $\beta = \omega/c$ such that at the instants t and at the abscissae point X, the electric E and magnetic H fields of a plane electromagnetic wave of frequency $\omega$, have the form A.e $(\beta^{x-} \omega^{t})$ A being a complex amplitude. This quantity $\beta$ depends in particular, on the one hand upon the refractive index of the medium of which the guide is made, this refractive index itself being a function of the frequency $\omega$ or p. $\omega$ of the wave propagating there, and on the other hand upon the thickness of the guide.

Figure 2:
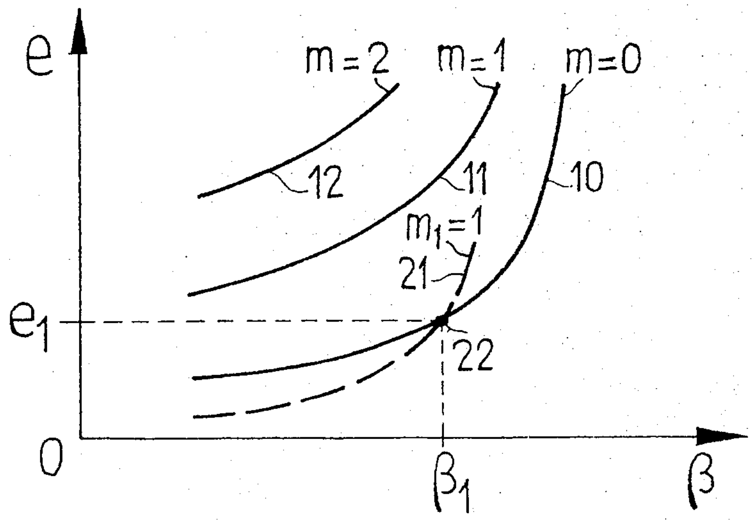
FIG. 2 is an explanatory figure.

FIG. 2 represents as a function of the thickness ($e$) of a flat guide such as the guide 1 shown in FIG. 1, the variations in the wave number $\beta$ of the waves passing through the guide, on the one hand, in respect of different modes of the wave of frequency $\omega$ (continuous line), and on the other hand as a function of one of the modes ($m_1 = 1$) of the second harmonic (broken line).

From an equation of the form:

$e = f(m, k, n_1, \beta, \phi_{12}, \phi_{10})$, where $m$ is a positive whole number representing the order of the propagated mode, which mode, in a guide of this kind, may be of the transverse electric kind TE or transverse magnetic kind TM; k the wave number of light in vacuum; $m_1$ the refractive index of the guide 1; $\phi_{10}$ and $\phi_{12}$ the respective phase shifts at the interfaces between the waveguide and the ambient medium, and between the waveguide 1 and the metal 2; there is obtained for a wave of frequency $\omega$ a family of curves characterised by the parameter $m$, amongst which curves there have been illustrated (in full line), those corresponding respectively to the first mode $m = 0$, curve 10, and to the higher modes $m = 1$, curve 11, and $m = 2$, curve 12.

For a harmonic wave of frequency 2 $\omega$, in a similar fashion a family of curves whose parameter is the order $_1$ of the modes, is obtained, only one of these, characterised by $m_1 = 1$, having been shown in FIG. 2 (curve 21), corresponding to the case where the material of which the film 1 is made is such that the refractive index for the fundamental wave is higher than the refractive index for the harmonic wave.

The curves 10 and 21 meet at a point 22 corresponding to a value $e_1$ of the thickness of the guide 1, in respect of which the wave numbers of fundamental wave and harmonic wave have the same value $\beta_1$.

The families of curves shown in FIG. 2 thus make it possible to determine the thickness to be given to the guide 1 (FIG. 1) in order for the respective propagation velocities of a fundamental wave of frequency $\omega$ propagating in accordance with a mode of order $m$, and a harmonic wave of frequency 2 $\omega$, to be equal so that the non-linear effects produced with each reflection of the fundamental wave at the surface of the metallic film 2, are phase matched.

By way of non-limitative example, a device in accordance with the invention has been produced, constituted by a substrate (3) upon which there were successively deposited an aluminium film 2, 200 A thick, and a glass film 1 having a thickness $e_1 = 8{,}250$ A and a refractive index $n_1 = 156$. By means of this device, it is possible to obtain, from a fundamental wave of wavelength $\lambda = 106\ \mu$, propagating in accordance with the $TE_o$ mode with a wave number $\beta_1 = k.\ 1464$, a harmonic wave of wavelength $\lambda/\mathbf{2}$ propagating in accordance with the $TE_1$ mode.

Figure 3:
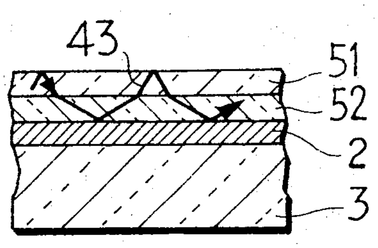
FIG. 3 represents a variant embodiment of the converter arrangement in accordance with the invention.

FIG. 3 illustrates a sectional view of a variant embodiment of the converter arrangement in accordance with the invention, in which the transparent dielectric film shown in FIG. 1, is replaced by a stratified waveguide. This stratified structure is constituted for example by two transparent dielectric films 51 and 52 one of which 51, in contact with the external medium (air), is characterised by a high refractive index so that the radiated energy beam 43 can propagate by total reflection at the interface between the film 51 and the air.

The other elements which go to make up the converter arrangement, as well as the way in which the latter operates, are the same as in the case described in FIG. 1, the harmonic waves developing at the interface between the film 52 and the film 2.

Figure 4:
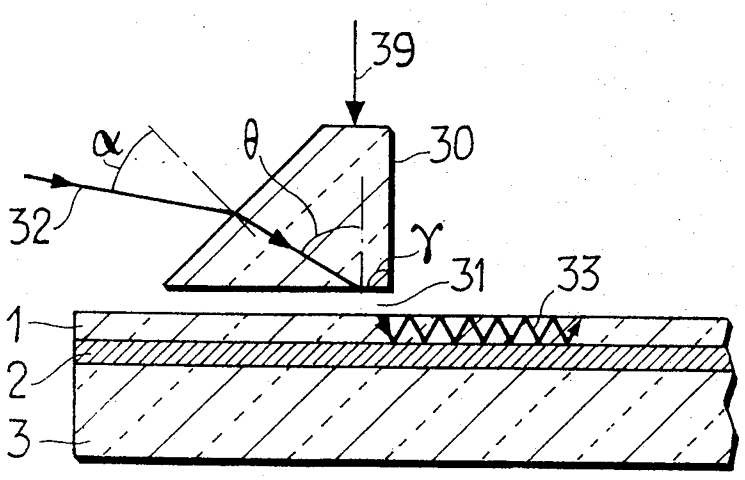
FIGS. 4 and 5 illustrate optical coupling devices which make it possible to excite and pick up the radiations travelling along the optical waveguide.

Because of the phenomenon of total reflection at the interface between the waveguide and the air, this being necessary in order to achieve propagation of the radiated energy through the waveguide, it is impossible to inject or pick up this energy at the ends of the guide by simple refraction. One embodiment of an optical coupling device for feeding the fundamental wave of frequency $\omega$ into the waveguide, has been shown in FIG. 4. It utilises a prism 30 having a first lateral face placed opposite the free face of the waveguide 1 of the device in accordance with the invention, as illustrated in FIG. 1; preferentially, the distance separating the first lateral face of the prism from the free face of the waveguide will be close to the wavelength which corresponds to the frequency $\omega$; the space between the first lateral face of the prism 30 and the guide 1 is marked 31.

A beam 32 of monochromatic, coherent radiated energy, emitted for example by a laser, is incident upon a second lateral face of the prism 30 at an angle of incidence $\alpha$; after refraction, this beam illuminates the first lateral face of the prism at an angle $\theta$; the angle $\alpha$ is chosen so that the angle $\theta$ is greater than the total reflection angle defined by Arc sin $(n_o/n_p)$, if $n_p$ is the refractive index of the prism and $n_o$ the refractive index of the external medium (generally air) the latter being smaller than the former.

In accordance with the laws of optical geometry, the light ray 32 then experiences total reflection at the first lateral face of the prism 30; however, it is well known that a fraction of the incident energy is present in the space 31 in the form of evanescent waves whose intensity descreases extremely rapidly in the direction perpendicular to their direction of propagation this latter coinciding with that of the waveguide. There is thus a transfer of energy from the prism 30 to the guide 1, across the space 31, this transfer giving rise to a radiated energy beam 33 propagating through the guide 1. This transfer is the more marked on the one hand the thinner the space 31 and on the other hand the nearer the wave number $\beta_e$ of the evanescent waves is to a possible value of the wave number of the waves in the guide 1.

This wave number $\beta_e$ is equal to $n_p \cdot k \cdot \sin\theta$, where $n_p$ is the refractive index of the prism 30, and it is a function of the angle $\theta$. It is therefore possible to select the value of the angle $\alpha$ so tht $\beta_e$ is exactly equal to the value $\beta_1$ of the wave number in the guide 1 as defined in FIG. 2. In addition, in order to ensure that the energy propagating through the guide 1 is not transferred by the same mechanism from the guide 1 to the prism 30, it is advantageous that the latter should terminate, close to the point of incidence of the beam 32 on its first lateral face in an angle $\phi$ not exceeding 90°.

Finally, in order to guarantee good energy transfer, it is possible to exert a thrust on the prism 30 in order to apply it against the guide 1; this thrust is symbolised by an arrow 39, its point of application being located upon a top facet of the prism.

Figure 5:
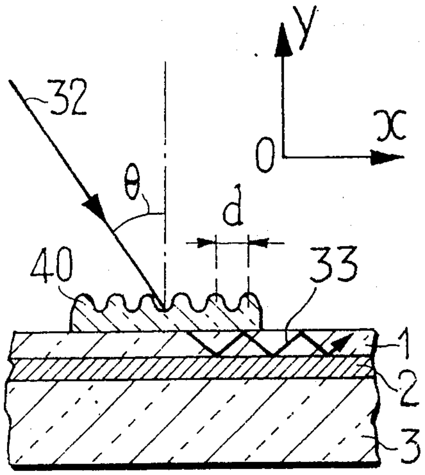

FIG. 5 illustrates another embodiment of the device for coupling the fundamental wave of frequency $\omega$ into the guide of the converter arrangement in accordance with the invention. This device utilises a phase grating.

In this figure, the following are illustrated: the device described in FIG. 1, constituted by a guide 1 and a metal film 2 deposited upon a substrate 3; a phase grating 40 deposited upon the waveguide 1; the incident light beam 32; and the beam 33 propagating through the guide 1.

The grating 40 is for example a holographic phase grating recorded in a photosensitive material previously deposited upon the guide 1. The beam of diffraction order p diffracted by this kind of grating is characterised by its emergence angle $\theta_p$ as a function of the angle of incidence $\theta$ of the beam 32, such that $n_1 \sin \theta_p = n_o \sin \theta + p\, \lambda/d$ or $n_1\, k \sin \theta_p = n_o\, k \sin \theta + p\, 2\pi/d,$ where: $n_1$ is the refractive index of the guide 1;

$n_o$ is that of the medium in which the device is located;

$\lambda$ is the wavelength of light in vacuum;

$k = 2\pi/\lambda$ is the corresponding wave number;

and $d$ is the pitch of the grating 40.

It has been observed that $n_1 \cdot {}^{k\cdot} \sin \theta_p$ respresent the wave number of a beam of order p diffracted in the direction OX, this latter being the direction of propagation of a wave through the guide 1. In order to achieve an energy transfer which, from the incident beam 32, produces in the guide 1 a radiated energy beam whose wave number is equal to $\beta_1$ as defined in FIG. 2, it is merely necessary to choose the angle of incidence $\theta$ so that the quantity $n_1 \cdot {}^{k \cdot \sin} \theta_p$ is equal to $\beta_1$.

Other methods of injection of the beam at the fundamental frequency into the waveguide 1, are also possible: for example, one end of the guide can be progressively tapered so that the guide-air and guide-metal interfaces are no longer parallel, thus enabling the beam to be injected by simple refraction at the guide-air interface. These different methods can of course be utilised for the picking up of the harmonic beam from the guide 1.

Figures 6, 8:
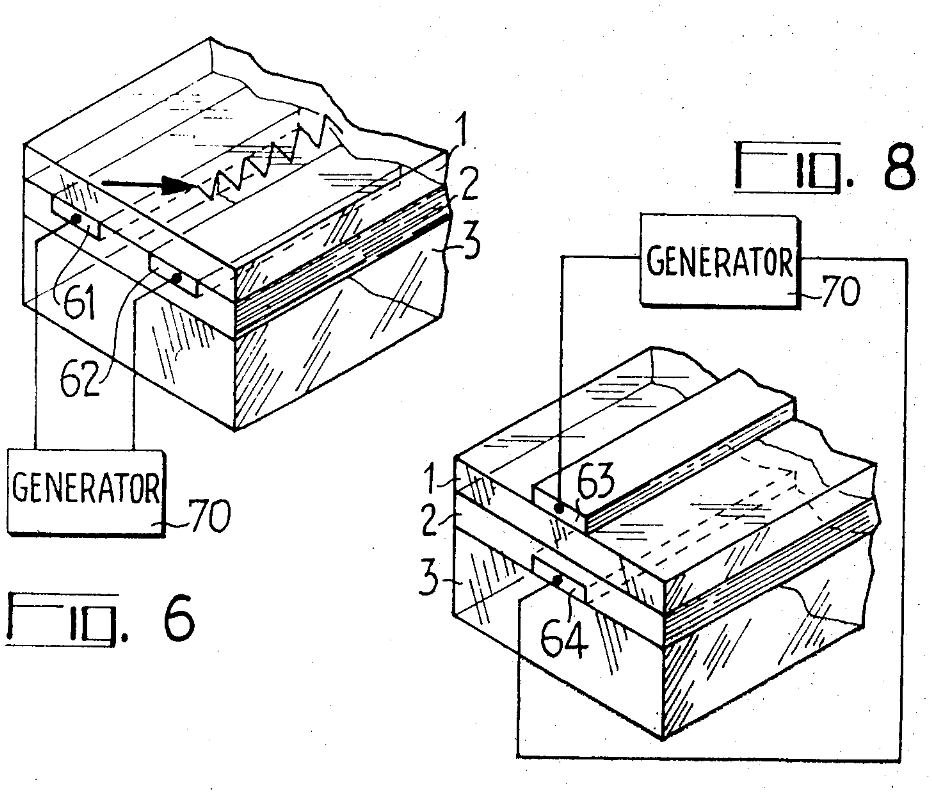
FIG. 6 illustrates an embodiment of the converter arrangement in accordance with the invention, allowing the modulation of the travelling radiations.
FIG. 8 illustrates a variant embodiment of the arrangement described in FIG. 6.

FIG. 6 illustrates an embodiment of a converter arrangement in accordance with the invention, in which the latter is utilised as a modulator.

The arrangement illustrated utilises, by way of example, that embodiment of the converter arrangement illustrated in FIG. 1, namely a substrate 3 upon which there have been successively deposited the film 2 and the transparent dielectric film 1. The film 2, in this application, will advantageously be constituted by an electrically nonconductive material such as silicon, so that there can be readily included in this film, in order to surround the operative part of the interface between film 1 and film 2, two electrodes 61 and 62 connected to a voltage source 70. The film 1 can then be constituted by silica.

In operation, a potential difference supplied between the electrodes 61 and 62 creates an electric field in particular in the film 1, which field produces a square-law variation in the refractive index $n_1$ of this film, by the electro-optical effect.

Considering the equation $e = f(m, k, n_1, \beta, \phi_{12}, \phi_{10})$ referred to hereinbefore, it will be seen that for a given guide, that is to say for $e$ constant, the variation of the refractive index $n_1$ means a corresponding variation in the wave NUMBER. number.

Figure 7:
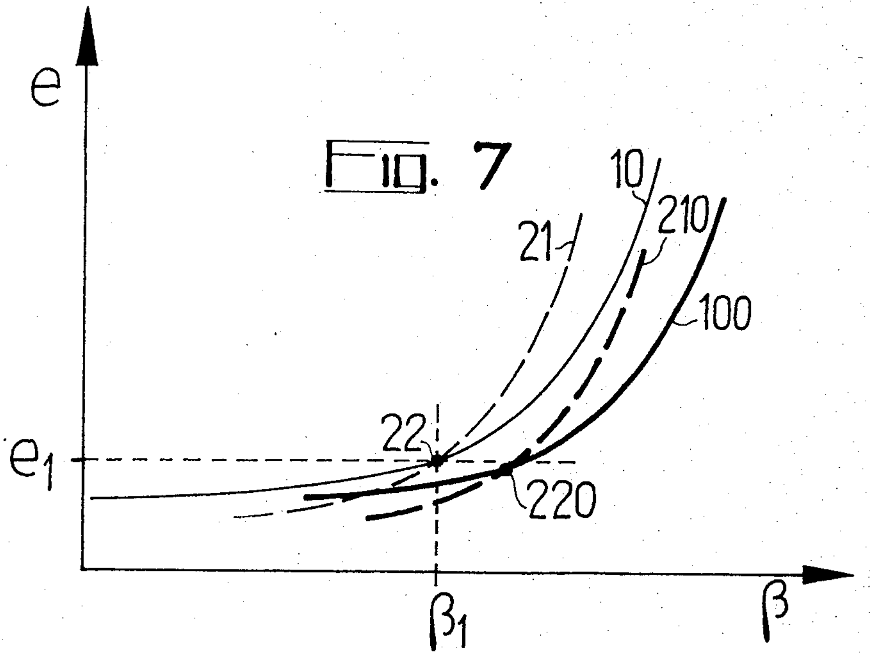
FIG. 7 is an explanatory diagram.

FIG. 7 illustrates the variations in the wave number $\beta$ as a function of the thickness $e_1$ of the film 1, on the one hand in the absence of any electric field (curves 10 and 21), respectively applying to fundamental and harmonic waves, and on the other hand in the presence of an electric field (curves 100 and 210). The curves 10 and 21 meet at the point 22 corresponding to the particular value $e_1$ of the thickness of the film 1, for which the wave number, and consequently the velocity of propagation of the waves, is the same in the case of both fundamental and harmonic waves, as FIG. 2 shows. The curves 100 and 210 also meet at a point 220 in respect of which fundamental and harmonic waves have the same wave number, but this point 220 does not correspond to the same value ($e_1$) of the thickness of the propagating medium, that is to say that for the value $e_1$ the thickness and the wave number of fundamental and harmonic waves, are only equal in the absence of electric field, but increasingly differ from one another when the field E builds up. Thus, a means of modulating the amplitude of the harmonic wave is at hand, by simple variation of the potential applied to the electrodes 61 and 62. The fundamental wave also experiences amplitude modulation under the effect of this control potential, since it influences the conversion efficiency.

FIG. 8 illustrates a variant embodiment of the modulator described hereinabove, in which the electrodes 61 and 62 are deleted and replaced by electrodes 63 and 64, the first 63 being arranged upon the surface of the dielectric film and the second 64 being included in the film 2.

In each of the embodiments described hereinabove, the length of the electrodes in the direction of transmission of the waves, naturally determines the intensity of the modulating effect.

What we claim is:

1. Travelling wave frequency converter arrangement for generating a harmonic electromagnetic radiation of frequency p times higher than the frequency of an incoming fundamental electromagnetic radiation, $p$ being an integer greater than unity, said arrangement comprising: an optical waveguide layer of at least one refractive material having one free face and a further face parallel to said free face, a further material positioned for forming with said further face an interface having harmonic generation properties, and coupling means arranged at the opposite ends of said free face for respectively launching and collecting at least one of said electromagnetic radiations travelling along said optical waveguide layer; the thickness of said refractive material being selected for matching with one another the respective phase velocities of said electromagnetic radiations.

2. Arrangement as claimed in claim 1, wherein said optical waveguide layer is a glass layer; said further material being a metal.

3. Arrangement as claimed in claim 1, wherein said coupling means comprise at each of said ends, a prism having a first lateral face arranged on said free face said fundamental electromagnetic radiation undergoing refraction at a second lateral face of said prism, and falling onto said first lateral face at an angle of incidence greater than the limiting angle of refraction; the injection of said fundamental electromagnetic radiation being carried out by means of the evanescent waves generated along said first lateral face.

4. Arrangement as claimed in claim 1, wherein said coupling means comprise, at each of said ends, a holographic phase grating, the injection of said fundamental electromagnetic radiation being carried out along a transmission path corresponding to one of the diffraction orders of said grating.

5. Arrangement as claimed in claim 1, wherein said optical waveguide layer is constituted by two superimposed films.

6. Arrangement as claimed in claim 1, further comprising electrical modulating means for creating an electric field in said refractive material; said electric field causing an amplitude modulation of said electromagnetic radiations.

7. Arrangement as claimed in claim 6, wherein said further material is an electrically non-conductive material; said electrical modulating means comprising at least two electrodes surrounding said interface over a portion at least of the path along which said electromagnetic radiations are transmitted by said optical waveguide layer.

8. Arrangement as claimed in claim 7, wherein said electrodes are located in a plane parallel to said interface.

9. Arrangement as claimed in claim 7, wherein said electrodes are stacked on one another along a direction substantially perpendicular to said interface.

* * * * *